US006477492B1

(12) United States Patent
Connor

(10) Patent No.: US 6,477,492 B1
(45) Date of Patent: Nov. 5, 2002

(54) SYSTEM FOR AUTOMATED TESTING OF PERCEPTUAL DISTORTION OF PROMPTS FROM VOICE RESPONSE SYSTEMS

(75) Inventor: Kevin J. Connor, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/333,778

(22) Filed: Jun. 15, 1999

(51) Int. Cl.[7] .............................................. G10L 15/08

(52) U.S. Cl. ....................... 704/236; 704/231; 379/1.02

(58) Field of Search ................................ 704/236, 231, 704/200.1; 379/1.02

(56) References Cited

U.S. PATENT DOCUMENTS

| | | | | |
|---|---|---|---|---|
| 3,637,954 A | | 1/1972 | Anderson et al. | |
| 4,727,566 A | | 2/1988 | Dahlqvist | |
| 4,918,685 A | | 4/1990 | Tol et al. | |
| 5,008,923 A | | 4/1991 | Kitamura et al. | |
| 5,303,228 A | | 4/1994 | Tzeng | |
| 5,572,570 A | * | 11/1996 | Kuenzig | 379/1.02 |
| 5,600,718 A | | 2/1997 | Dent et al. | |
| 5,621,854 A | | 4/1997 | Hollier | |
| 5,680,450 A | | 10/1997 | Dent et al. | |
| 5,835,565 A | * | 11/1998 | Smith et al. | 379/27.04 |
| 5,848,384 A | * | 12/1998 | Hollier et al. | 704/231 |
| 6,091,802 A | * | 7/2000 | Smith et al. | 379/10.03 |
| 6,304,634 B1 | * | 10/2001 | Hollier et al. | 379/22.02 |

FOREIGN PATENT DOCUMENTS

| | | | | |
|---|---|---|---|---|
| WO | WO 96/06496 | * | 2/1996 | 704/231 |

* cited by examiner

*Primary Examiner*—Marsha D. Banks-Harold
*Assistant Examiner*—Donald L. Storm
(74) *Attorney, Agent, or Firm*—Marger Johnson & McCollom, PC

(57) ABSTRACT

A Perceptual Speech Distortion Metric (PSDM) generates perceptual distortion values for voice prompts received from a voice response system by comparing the received voice prompts with reference signals associated with the same states in the voice response system. The perceptual distortion values identify the voice prompts as either correct or incorrect responses to signal generator inputs and also quantify an amount of perceptual distortion in the voice prompts.

40 Claims, 4 Drawing Sheets

SYSTEM FOR AUTOMATED TESTING OF PERCEPTUAL DISTORTION OF PROMPTS FROM VOICE RESPONSE SYSTEMS

BACKGROUND OF THE INVENTION

This invention relates to automated testing of a Voice Response System (VRS), and more particularly to testing the correctness and speech quality of VRS prompts using a Perceptual Speech Distortion Metric (PSDM).

Automated Voice Response Systems include applications such as Auto-Attendants (AA), voice mail and voice-menus. A user navigates through a VRS menu by pressing keys on a standard touch-tone telephone. Pressing the keys generate Dual Tone Multiple Frequency (DTMF) signals. The VRS responds to the DTMF signals by generating speech signals, hereafter known as 'prompts.

When a call is established with the VRS, the VRS plays out a particular speech file that invites the user to respond by pressing a telephone key (0–9,*,#). Depending on the key pressed, the VRS responds by playing out an appropriate prompt inviting a further user response. The process of prompt and user response is repeated until the user accesses the right service or is connected with the correct department, etc. VRS applications have state machines that define what prompt is played and the acceptable user response, i.e., the states that are reachable from the current state. A map of these states and the allowable transitions among the states is referred to as a state tree or state machine.

The VRS needs to be tested to determine whether particular keypresses are decoded correctly and whether the correct prompt or recorded voice is played back. There are two major components to testing VRSs. One testing component tests how well the VRS accepts DTMF tones conforming to certain time and frequency standards and rejects those DTMF tones that do not. A second component tests the logical integrity or consistency of the VRS state machine. Given a valid DTMF tone, this testing component verifies that the VRS state machine progresses correctly through the indicated or desired states.

One testing method is to manually walk through the VRS state tree using an operator's hand and ear to manually identify any perceived logical errors in the system. This manual testing method does not scale well for monitoring the performance of the VRS under load conditions. It would be difficult and expensive for a few hundred people to repeatedly dial-up and listen to the same VRS at the same time.

An automated test method uses a speech recognition engine to verify proper VRS prompt responses. Repeated and possibly simultaneous calls are automatically made to the VRS under test. DTMF tones are automatically generated according to a script. Speech recognition technology is then used to identify the voice prompt as correct or incorrect by comparing the received speech with stored templates.

This automated test method is workable, but lacks robustness. For example, classification of speech is not 100% reliable even under perfect speech transmission conditions. Standard telephony-bandlimited channels present difficulties in accurately recognizing VRS voice prompts. Transmission problems, such as lost packets in a VoIP network and the use of low-bit-rate speech coders, reduce the ability to accurately recognize voice prompts. Speech recognition engines are also computationally intensive and require substantial time and effort for training. Because speech recognition engines are prohibitively time-consuming to develop, designers often are forced to license expensive third party software.

Outputs from speech recognition engines are essentially binary- correct or incorrect. However, when the VRS is under load due to high call volume, the prompts played out may be correct, but the output audio signal may be distorted. The level of distortion may be small enough so a listener can still understand the prompt. On the other hand, distortion may be so great that the listener cannot understand the voice prompt. Unfortunately, the prompts can only be classified by the speech recognition engine as 'perfectly correct' or 'perfectly incorrect'.

Accordingly, a need remains for a simple low-cost system that more effectively tests Voice Response Systems.

SUMMARY OF THE INVENTION

The Voice Quality Test (VQT) platform uses a Perceptual Speech Distortion Metric (PSDM) such as, but not limited to, ITU standard P.861 (PSQM) to effectively test Voice Response Systems (VRS). The VQT platform automatically initiates an off-hook condition and dials a VRS phone number over a telephone line. The VRS at the dialed phone number answers the phone call and sends an initial voice prompt to the VQT platform. A signal generator on the VQT platform generates sequences of DTMF tones that progress through the state tree of the VRS according to a user test script. The VRS responds with voice prompts that are recorded by a signal recorder on the VQT platform.

A reference speech library in the VQT platform contains reference signals representing the correct voice prompts for each one of the states in the VRS. The PSDM generates a perceptual distortion value for each voice prompt received from the VRS by comparing the received voice prompt with the reference signals associated with the same VRS state. The perceptual distortion values are used to identify the received voice prompts as either correct or incorrect responses to the signal generator DTMF tones. The perceptual distortion values also have the advantage of quantifying different amounts of perceptual distortion in the voice prompts.

By using the perceptual sound quality matrix, the VQT platform can more accurately distinguish correct voice prompts from incorrect voice prompts. In addition, the VQT can identify correct voice prompts that, due to distortion, are either difficult to understand or completely unintelligible. This provides more detailed and accurate analysis of VRS systems using relatively simple testing equipment.

A further testing capability is realized because the invention offers the capability of recognizing whether the received voice prompt is correct or incorrect. The invention controls the VRS system under test by generating DTMF tones. A VRS system must classify incoming DTMF tones as valid or invalid based on the duration and frequency content of these tones. For example, a DTMF tone of only 20 milliseconds (ms) duration should not be accepted by the VRS, and should not result in a state change. The DTMF generator embodied in the invention offers control over tone timing (digit duration and inter-digit silence duration), and independent control over DTMF tone levels and frequencies. Through this function, the VRS system under test can be stimulated with tones that are either valid or invalid, and the corresponding acceptance or rejection of these tones by the VRS is monitored.

The foregoing and other objects, features and advantages of the invention will become more readily apparent from the following detailed description of a preferred embodiment of the invention which proceeds with reference to the accompanying drawings.

DETAILED DESCRIPTION

Figure 1:
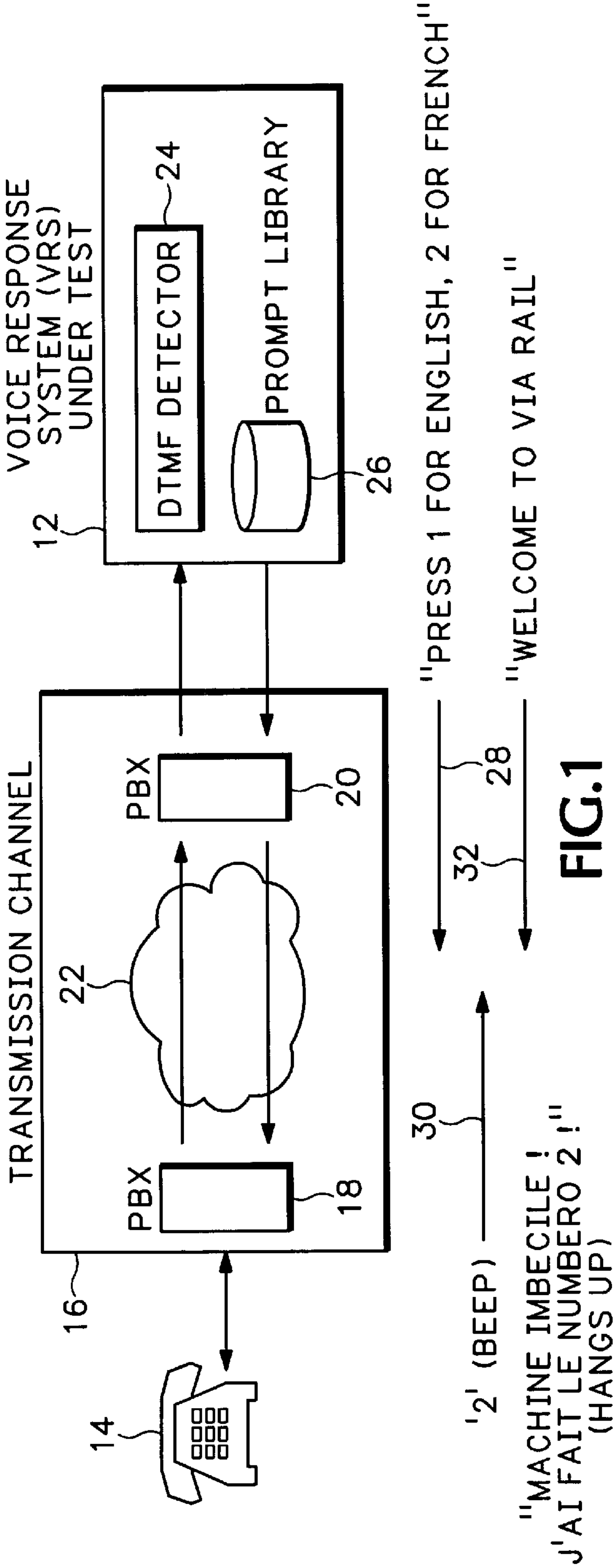
FIG.1 (PRIOR ART)
FIG. 1 is a prior art diagram of a Voice Response System (VRS) connected to a telephone.

FIG. 1 illustrates the operation of a prior art VRS 12 running a voice menu application. The VRS 12 includes a Dual Tone Multi-Frequency (DTMF) detector 24 and a prompt library 26. A telephone 14 connects to the VRS 12 through a transmission channel 16. The transmission channel 16 in one instance comprises a Public Branch Exchange (PBX) 18 coupled through a telephone network 22 to another PBX 20.

The VRS 12 issues an initial prompt 28 after the phone 14 dials up the VRS phone number. For example, the VRS 12 may initially prompt a user to press the number '1' on phone 14 to receive further prompts in English or press the number '2' to receive further prompts in French. The user generates a response 30 by pressing '2' on the phone 14 to receive further voice prompts in French. If the VRS 12 does not work correctly, the VRS reply prompt 32 may be incorrect.

For example, instead of sending subsequent prompts from prompt library 26 in French as requested, the VRS 12 might incorrectly send prompts 32 in English. This error may be due to a failure of the DTMF detector 24 to properly identify the DTMF signals representing the '2' keypress or an error in a logic application program in the VRS 12. In either case, it is desirable to provide an automated testing system that places repeated calls to the VRS 12, generates sequences of DTMF tones, and more accurately classifies the VRS responses while walking through the VRS state machine.

Figure 2:
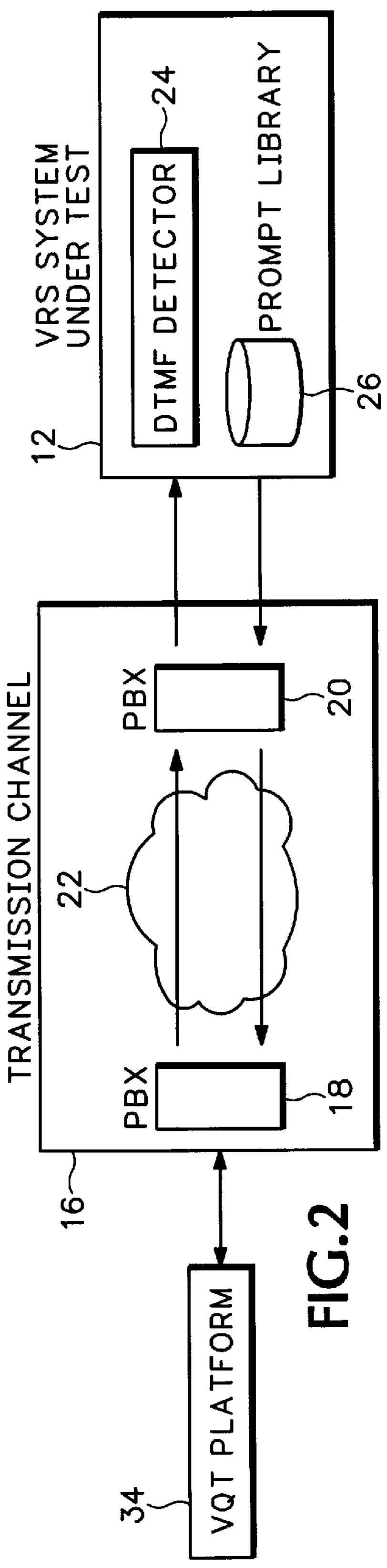
FIG. 2 is a diagram of the VRS of FIG. 1 connected to a Voice Quality Test (VQT) platform according to the invention.

FIG. 2 is a schematic of a Voice Quality Test (VQT) platform 34 that more effectively verifies VRS prompts according to the invention. The VQT platform 34 is connected to the transmission channel 16 via a 2-wire or 4-wire interface such as FxO, Ear and Mouth (E&M), T1/E1, or Ethernet. The transmission channel 16 can be any communication medium that allows a telephone 14, computer, etc. to access the VRS 12. For example, the transmission channel 16 can be any type of a packet-switched or current-switched network or simply a test cable coupled directly between the VQT platform 34 and VRS 12.

Figure 3:
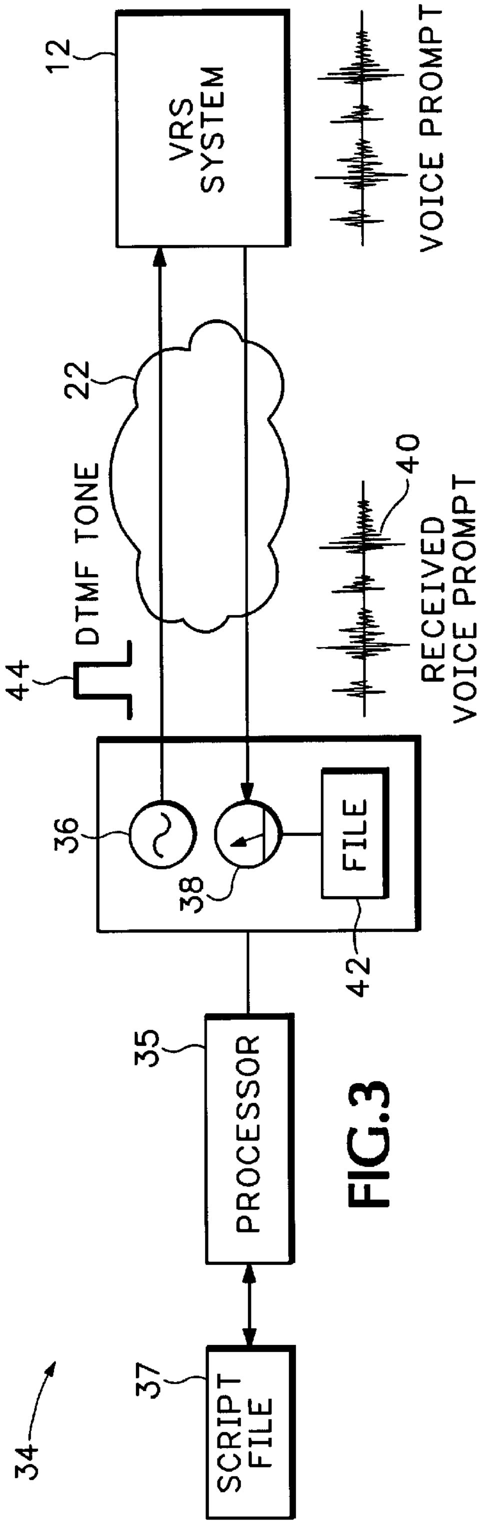
FIG. 3 is a detailed diagram of the VQT platform shown in FIG. 2.

FIG. 3 is a more detailed functional diagram of the VQT platform 34 shown in FIG. 2. The VQT platform 34 uses two signal nodes to interact with the VRS 12 under test. A signal generator node 36 produces DTMF tones 44, and a signal recording node 38 stores to a file 42 voice prompt signals 40 received from VRS 12. A telephone call is made to the VRS 12 using the VQT platform 34. The DTMF tones 44 are automatically generated by the signal generator node 36 and the returning VRS prompts 40 are automatically recorded by signal recording node 38. Systems for automatically generating a phone off-hook condition, generating DTMF tones and recording voice signals on telephone lines are well known and are therefore not described in further detail.

A processor 35 in a Personal Computer (PC) varies the amplitude, time and frequency parameters of the DTMF tones 44, the sequence of DTMF tones 44 played, and the expected duration of the prompts 40 to be recorded. The sequence of tones and the expected duration of the received voice prompts 40 define a particular traversal of the state machine in the VRS 12 under test. This information is preloaded into the VQT platform 34 via a script file 37. After a call is made, the processor 35 uses the script file to direct the signal generator 36 to output the DTMF tones 44 that step through these different states in the VRS 12 state machine.

Figure 4:
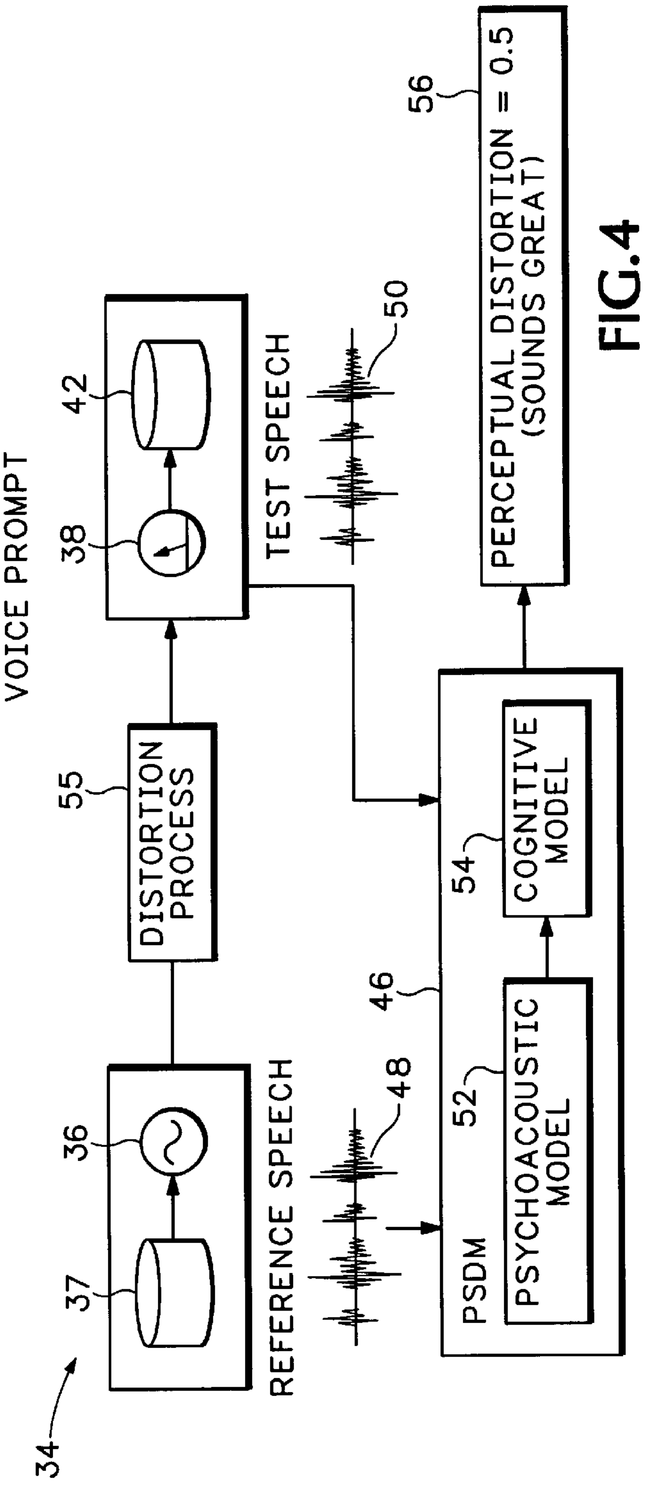
FIG. 4 is a diagram of a Perceptual speech distortion metric (PSDM) used in the VQT platform shown in FIG. 2.
Figure 5:
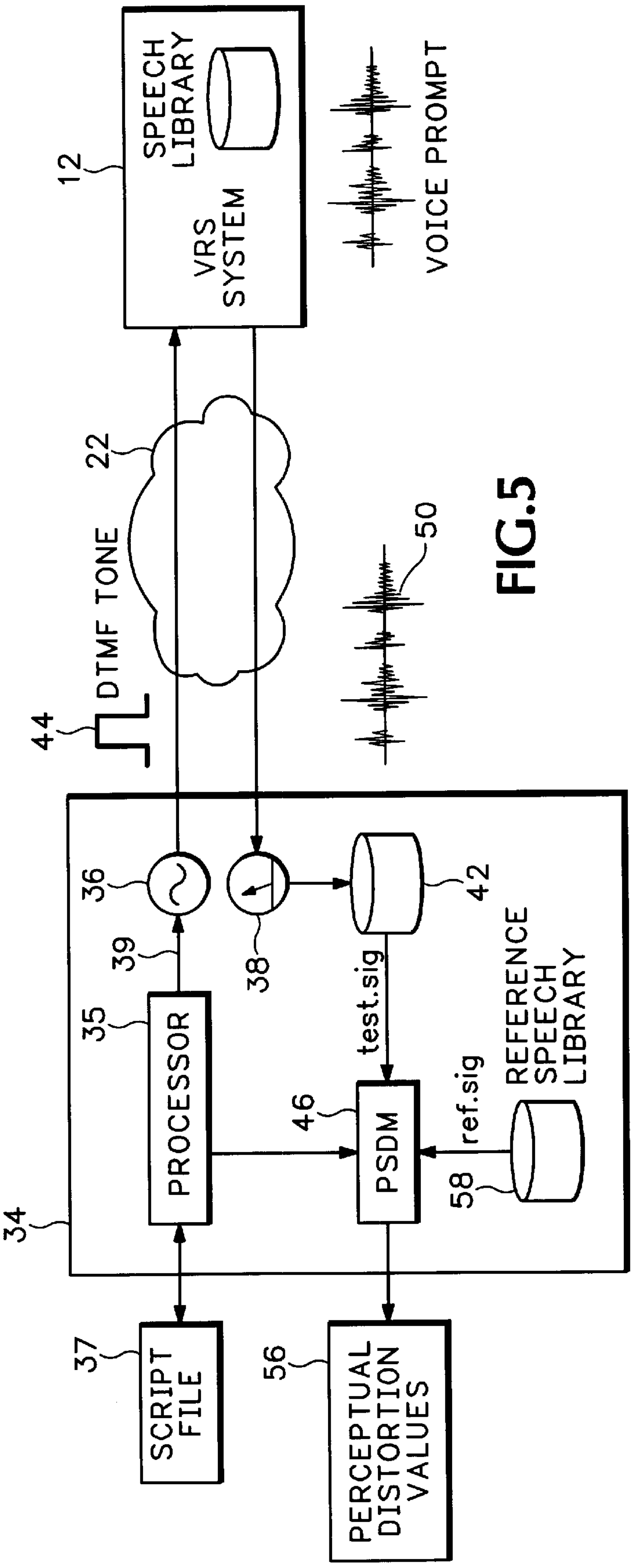
FIG. 5 is another detailed diagram of the VQT platform shown in FIG. 2.

Referring to FIG. 4, of particular importance in the VQT platform 34 is a Perceptual Speech Distortion Metric (PSDM) 46. FIG. 4 is an example of how a PSDM works in general. FIG. 5 shows how the PSDM 46 is used in an innovative way according to the invention. The VQT platform 34 uses the PSDM 46 to compare a reference speech signal 48 with a test speech signal 50. The test speech signal 50 is a recording of the reference speech signal 48 after it has passed through an audio distortion process 55. The audio distortion process 55 represents any distortion created in the DTMF tones 44 or distortion in the received voice prompt 50 caused any telephone circuitry such as codecs, routers, switches, etc. used in the telephone network 22 or transmission channel 16 (FIG. 2). The PSDM 46 provides a quantitative estimation of the effect of this distortion on a typical human listener.

PSDM algorithms typically generate a number which is proportional to the audible degradation of the speech signal, a number which correlates well with results obtained from humans in listening test experiments, given the same speech samples. PSDMs might be considered as 'human listeners in a box', which yield opinions on 'how bad does the test speech signal sound compared to the ref speech signal?'. Traditional mean-square error or linear signal distortion measures such as Total Harmonic Distortion (THD) or Signal-to-Noise Ratio (SNR) cannot provide adequate answers to this question, especially if the network under test includes non-linear devices such as low-bit-rate speech codecs, which is increasingly the case. PSDMs yield much better agreement with human listener opinions as they incorporate sophisticated models of human auditory and cognitive processes.

The PSDM 46 generates a Perceptual Distortion Value (PDV) 56. The perceptual distortion value is a number in the effective range 0 (test speech 50 sounds identical to reference speech 48) to about 6 (test speech 50 sounds completely unlike reference speech 48, implying that the utterances are in fact, different). The PSDM 46 determines whether or not the received test speech signal 50 is the correct voice prompt for the current VRS state, and also estimates the audio transmission quality of the received test speech signal 50.

FIG. 5 shows how the PSDM 46 is implemented in the VQT platform 34 and used for voice prompt verification. The unique application/configuration of a PSDM for voice prompt verification is a key innovation of the invention. Script sequences corresponding to the state machine in the VRS 12 under test are stored in the script file 37. The processor 35 in the VQT platform 34 steps through the script file 37 generating inputs 39 for signal generating node 36. Signal generating node 36 outputs corresponding DTMF tones 44 on network 22. The test speech signals 50 received from the VRS 12 are recorded by the signal recording node 38 as test.sig and stored in file 42. The amount of time recording node 38 is activated for capturing these recordings is specified in the script file 37. Reference voice signals (ref.sig) are prestored in a reference speech library 58. The PSDM 46 compares the ref.sig signals in library 58 with test.sig signals in file 42 corresponding with the same VRS state. The PSDM 46 then outputs perceptual distortion values 56 for each received test speech signal 50.

Figure 6:
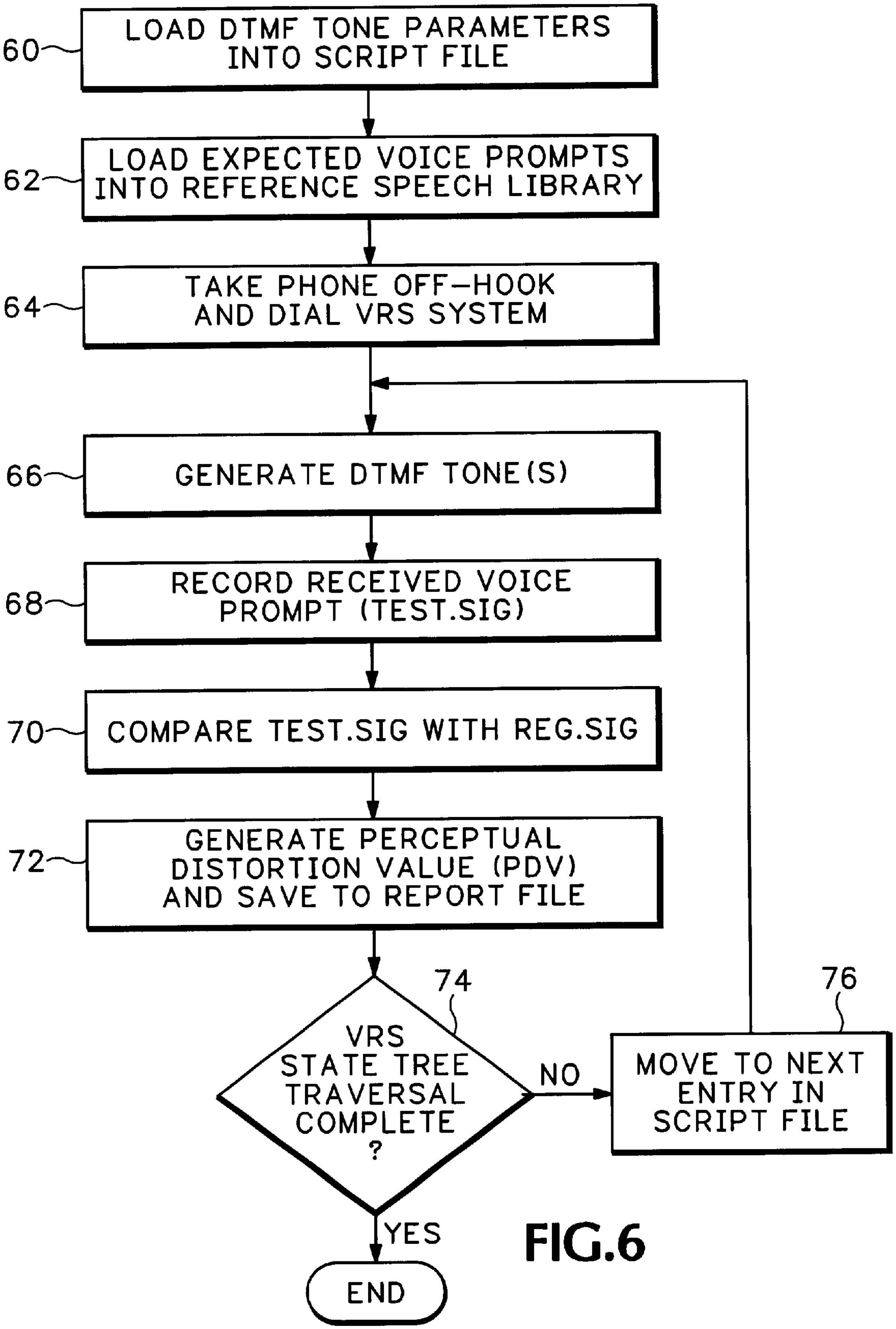
FIG. 6 is a flow chart showing how the VQT platform automatically tests the VRS according to the invention.

FIG. 6 is a flow diagram showing in more detail one example of how the PSDM 46 operates. Sequences of scripts are preloaded into the script file 37 (FIG. 5) in step 60. The script files specify DTMF tone parameters such as digit, tone duration, inter-digit silence duration and tone levels, in addition to recording parameters such as recording duration, and the name of the reference audio file which is expected as the VRS response to this tone.

The voice prompts associated with the DTMF tones are preloaded into the reference speech library 58 (FIG. 5) in step 62. The phone at the VQT platform is automatically taken off-hook and the VRS system dialed in step 64.

After a first prompt is generated, the VQT platform automatically generates DTMF tone(s) 44 responding to the voice prompt in step 66. Subsequent voice prompt responses are received from the VRS 12 and recorded in the test.sig file 42 in step 68. In step 70, the PSDM 46 compares the received prompt files test.sig with the ref.sig files in the reference speech library corresponding with the same VRS states.

If the VRS 12 is functioning correctly, test.sig and the pre-stored prompt ref.sig associated with the same VRS state should be identical. Both files are fed into the PSDM 46 in step 70. A Perceptual Distortion Value (PDV) is generated by the PSDM and saved in a report file in step 72. The VQT platform 34 then moves to the next entry in the script file in step 76 and the next state in the VRS state machine is traversed by generating the next DTMF tone 44 in step 66. Testing is complete when the VQT platform 34 has traversed the entire VRS state machine in decision step 74. Alternatively, the VQT platform 34 can be programmed to wait until prompts for all VRS states are recorded before generating the PDV values. In another case, the VQT is programmed to stop a current test when a PDV identifies an incorrect VRS voice prompt.

Each received prompt can be quantified. This can be done either manually or automatically with a software program in the VQT platform 34. Reports can also be customized for specific information of interest. For example, one report may list only those voice prompts identified as incorrect. The VQT platform 34 identifies different degrees of voice prompt quality and is therefore more robust than the limited binary correct/incorrect classifications of current voice recognition techniques. As a result, the VQT platform is better able to identify other sound quality problems that may or may not be related to the VRS system. The VQT platform 34 is also less computationally expensive than voice recognition algorithms, and can use public-domain code. Systems implementing VQT are less complex and, in turn, less expensive to implement.

Having described and illustrated the principles of the invention in a preferred embodiment thereof, it should be apparent that the invention can be modified in arrangement and detail without departing form such principles. I claim all modifications and variations coming within the spirit and scope of the following claims.

What is claimed is:

1. A system for testing a voice response system, comprising:

a signal generator generating inputs for the voice response system;

a signal recorder receiving voice prompts output by the voice response system in response to the inputs; and a perceptual sound quality analyzer outputting perceptual distortion values by comparing the received voice prompts with reference voice prompts, the perceptual distortion values identifying the received voice prompts as either correct or incorrect responses to the signal generator inputs while also identifying different amounts of distortion in the received voice prompts.

2. A system according to claim 1 including a script file that generates sequences of inputs that traverses through different states in the voice response system.

3. A system according to claim 2 including a reference speech library that stores and accesses the reference voice prompts associated with the different states traversed in the voice response system.

4. A system according to claim 1 wherein the inputs generated by the signal generator are DTMF tones.

5. A system according to claim 1 including a telephone network coupling the signal generator and signal recorder to the voice response system.

6. A system according to claim 1 wherein the perceptual sound quality analyzer comprises a perceptual speech quality metric using a psychoacoustic model and a cognitive model to generate the perceptual distortion values.

7. A system according to claim 1 including a processor that identifies the received voice prompts according to the perceived distortion values as either incorrect, correct-unintelligible, or correct-intelligible.

8. A system according to claim 7 wherein the processor identifies different distortion levels for the voice prompts identified as correct.

9. A method for testing an audio response system, comprising:

generating inputs for the audio response system;

receiving audio prompts output from the audio response system in response to the generated inputs;

generating perceptual distortion values by comparing the received audio prompts with associated reference audio prompts;

using the perceptual distortion values to identify received audio prompts that correctly respond to the generated inputs; and using the perceptual distortion values to quantify different amounts of perceptual distortion in the audio prompts.

10. A method according to claim 9 including generating a series of inputs that automatically progress through each state in the voice response system.

11. A method according to claim 10 including storing reference audio prompts associated with each state in the audio response system and comparing the stored reference audio prompts with the received audio prompts associated with the same audio response system state.

12. A method according to claim 9 wherein the input signals comprise DTMF tones.

13. A method according to claim 12 including transmitting the DTMF tones over a telephone network to the audio response system and receiving the audio prompts back over the same telephone network.

14. A method according to claim 12 including generating the same DTMF tones multiple times for different time durations.

15. A method according to claim 9 including generating the perceptual distortion values using a perceptual speech quality metric.

16. A method according to claim 9 including using the perceptual distortion values to automatically generate a report quantifying the received voice prompts as incorrect, correct-unintelligible, or correct-intelligible.

17. A method according to claim 9 including using the perceptual distortion values to identify the received voice prompts as correct, incorrect, or unintelligible and further quantify the correct voice prompts as having high distortion, medium distortion or low distortion.

18. A method according to claim 9 including for recording the audio prompts for an amount of time according to a current state of the audio response system.

19. A system for testing a voice response system; comprising:

a voice quality test platform automatically initiating an off-hook condition and dialing a phone number over a telephone line;

an auto-attendant connected to the telephone line automatically answering the dialed phone number and establishing a connection with the test platform, the auto-attendant generating voice prompts in response to DTMF tones sent over the telephone line;

a signal generator on the test platform automatically generating sequences of DTMF tones associated with different states in the auto-attendant;

a signal recorder on the test platform recording voice prompts generated by the auto-attendant in response to the DTMF tones generated by the signal generator;

a reference speech library containing reference voice prompts associated with different states in the voice response system; and a perceptual sound quality metric generating perceptual distortion values for the received voice prompts by comparing the received voice prompts with the reference voice prompts associated with the same voice response system states.

20. A system according to claim 19 wherein the perceptual distortion values indicate different levels of understandability of the voice prompts received at the test platform.

21. An electronic storage medium storing computer-readable program code executable for testing an audio response system, the computer-readable program code comprising:

code for generating inputs for the audio response system;

code for receiving audio prompts output from the audio response system in response to the generated inputs;

code for generating perceptual distortion values by comparing the received audio prompts with associated reference audio prompts;

code for using the perceptual distortion values to identify received audio prompts that correctly respond to the generated inputs; and code for using the perceptual distortion values to quantify different amounts of perceptual distortion in the audio prompts.

22. An electronic storage medium according to claim 21 including code for generating a series of inputs that automatically progress through each state in the voice response system.

23. An electronic storage medium according to claim 22 including code for storing reference audio prompts associated with each state in the audio response system and code for comparing the stored reference audio prompts with the received audio prompts associated with the same audio response system state.

24. An electronic storage medium according to claim 21 wherein the input signals comprise DTMF tones.

25. An electronic storage medium according to claim 24 including code for transmitting the DTMF tones over a telephone network to the audio response system and code for receiving the audio prompts back over the same telephone network.

26. An electronic storage medium according to claim 24 including code for generating the same DTMF tones multiple times for different time durations.

27. An electronic storage medium according to claim 21 including code for generating the perceptual distortion values using a perceptual speech quality metric.

28. An electronic storage medium according to claim 21 including code for using the perceptual distortion values to automatically generate a report quantifying the received voice prompts as incorrect, correct-unintelligible, or correct-intelligible.

29. An electronic storage medium according to claim 21 including code for using the perceptual distortion values to identify the received voice prompts as correct, incorrect, or unintelligible and further quantify the correct voice prompts as having high distortion, medium distortion or low distortion.

30. An electronic storage medium according to claim 21 including code for recording the audio prompts for an amount of time according to a current state of the audio response system.

31. A system for testing an audio response system, comprising:

means for generating inputs for the audio response system;

means for receiving audio prompts output from the audio response system in response to the generated inputs;

means for generating perceptual distortion values by comparing the received audio prompts with associated reference audio prompts;

means for using the perceptual distortion values to identify received audio prompts that correctly respond to the generated inputs; and means for using the perceptual distortion values to quantify different amounts of perceptual distortion in the audio prompts.

32. A system according to claim 31 including means for generating a series of inputs that automatically progress through each state in the voice response system.

33. A system according to claim 32 including means for storing reference audio prompts associated with each state in the audio response system and means for comparing the stored reference audio prompts with the received audio prompts associated with the same audio response system state.

34. A system according to claim 31 wherein the input signals comprise DTMF tones.

35. A system according to claim 34 including means for transmitting the DTMF tones over a telephone network to the audio response system and means for receiving the audio prompts back over the same telephone network.

36. A system according to claim 34 including means for generating the same DTMF tones multiple times for different time durations.

37. A system according to claim 31 including means for generating the perceptual distortion values using a perceptual speech quality metric.

38. A system according to claim 31 including means for using the perceptual distortion values to automatically generate a report quantifying the received voice prompts as incorrect, correct-unintelligible, or correct-intelligible.

39. A system according to claim 31 including means for using the perceptual distortion values to identify the received voice prompts as correct, incorrect, or unintelligible and further quantify the correct voice prompts as having high distortion, medium distortion or low distortion.

40. A system according to claim 31 including means for recording the audio prompts for an amount of time according to a current state of the audio response system.

* * * * *